(12) United States Patent
Chan

(10) Patent No.: US 10,261,552 B2
(45) Date of Patent: Apr. 16, 2019

(54) METHOD OF CONNECTING MASS STORAGE DEVICE

(76) Inventor: Kam Fu Chan, Hong Kong (CN)

( * ) Notice: Subject to any disclaimer, the term of this patent is extended or adjusted under 35 U.S.C. 154(b) by 1390 days.

(21) Appl. No.: 13/568,930

(22) Filed: Aug. 7, 2012

(65) Prior Publication Data

US 2012/0303852 A1 Nov. 29, 2012

Related U.S. Application Data

(63) Continuation of application No. 11/921,356, filed as application No. PCT/IB2006/051469 on May 10, 2006, now Pat. No. 8,266,359.

(30) Foreign Application Priority Data

Jun. 3, 2005 (WO) .................. PCT/IB2005/051881

(51) Int. Cl.
*G06F 1/18* (2006.01)

(52) U.S. Cl.
CPC .................. *G06F 1/187* (2013.01)

(58) Field of Classification Search
CPC ................................ G06F 13/36; G06F 13/38
USPC .................... 710/300–306; 713/300
See application file for complete search history.

(56) References Cited

U.S. PATENT DOCUMENTS

| | | | |
|---|---|---|---|
| 5,574,920 A * | 11/1996 | Parry .................... | G06F 1/3215 360/69 |
| 6,219,734 B1 * | 4/2001 | Wallach et al. ............... | 710/302 |
| 6,594,721 B1 * | 7/2003 | Sakarda ................. | G06F 9/4411 710/302 |
| 6,774,904 B2 | 8/2004 | Emerson et al. | |
| 7,393,247 B1 * | 7/2008 | Yu ......................... | G06F 13/409 439/638 |
| 7,484,110 B2 | 1/2009 | Stufflebeam | |
| 7,487,372 B2 | 2/2009 | Botchek | |
| 2003/0046471 A1 | 3/2003 | Sivertsen | |
| 2004/0225832 A1 | 11/2004 | Huang | |
| 2004/0225836 A1 | 11/2004 | Lin | |
| 2005/0105265 A1 * | 5/2005 | Petrov .................. | G11B 33/126 361/679.33 |

(Continued)

FOREIGN PATENT DOCUMENTS

| CN | 1391153 | 1/2003 |
|---|---|---|
| CN | 1456957 | 11/2003 |

(Continued)

OTHER PUBLICATIONS

International Search Report dated Jan. 5, 2006, issued in International Application No. PCT/IB2005/051811.

(Continued)

*Primary Examiner* — Tim T Vo
*Assistant Examiner* — Kim T. Huynh
(74) *Attorney, Agent, or Firm* — Buchanan Ingersoll & Rooney PC

(57) ABSTRACT

Method for connecting mass storage device(s) with data connection device(s) connecting to data port(s) with the same data interface type(s) as that of the mass storage device(s) for data transmission and with power connection device(s) connecting to power port(s), for power supply, on a bus of technologies with power management capabilities and facilities in computer-related or computer-controlled or operating-system-controlled machines or devices for using and swapping the mass storage device(s).

21 Claims, 3 Drawing Sheets

USB Cable from Hard Disk connected to USB Port of Motherboard

IDE Cable from Hard Disk connected to IDE Port of Motherboard

(56) References Cited

U.S. PATENT DOCUMENTS

| | | |
|---|---|---|
| 2005/0268132 A1 | 12/2005 | Yun et al. |
| 2006/0167886 A1* | 7/2006 | Kantesaria ............ G06F 9/4405 |
| 2008/0215871 A1* | 9/2008 | Chan ................................ 713/2 |
| 2009/0024779 A1 | 1/2009 | Chan |

FOREIGN PATENT DOCUMENTS

| | | |
|---|---|---|
| JP | 10-27154 | 1/1998 |
| JP | 2004-145866 | 5/2004 |
| JP | 2004-178535 | 6/2004 |

OTHER PUBLICATIONS

International Search Report dated Jan. 4, 2007, issued in International Application No. PCT/IB2006/051469.

U.S. Office Action dated Mar. 31, 2009, issued in U.S. Appl. No. 11/921,356.

U.S. Office Action dated Oct. 29, 2009, issued in U.S. Appl. No. 11/921,356.

U.S. Office Action dated Mar. 4, 2010, issued in U.S. Appl. No. 11/921,356.

U.S. Office Action dated Aug. 30, 2010, issued in U.S. Appl. No. 11/921,356.

U.S. Office Action dated Dec. 23, 2010, issued in U.S. Appl. No. 11/921,356.

U.S. Office Action dated Jun. 21, 2011, issued in U.S. Appl. No. 11/921,356.

U.S. Office Action dated Sep. 19, 2011, issued in U.S. Appl. No. 11/921,356.

U.S. Office Action dated Mar. 1, 2012, issued in U.S. Appl. No. 11/921,356.

* cited by examiner

METHOD OF CONNECTING MASS STORAGE DEVICE

CROSS-REFERENCE TO RELATED APPLICATIONS

The present application is a continuation of U.S. application Ser. No. 11/921,356 filed on Nov. 29, 2007, entitled "Method of Connecting Mass Storage Device," which is a U.S. National phase entry of International Appl. No. PCT/IB2006/051469, filed May 10, 2006, entitled "Method of Connecting Mass Storage Device," which claims priority under 35 U.S.C. § 365(c) to International Appl. No PCT/IB2005/051811, filed Jun. 3, 2005, each of which is incorporated by reference in its entirety herein. Both of the above-noted International Applications, PCT/IB2005/051811 and PCT/IB2006/051469, designate the United States.

BACKGROUND OF THE PRESENT INVENTION

Field of Invention

This invention relates to connecting mass storage device(s) for use by running operating systems in computers (used hereafter as including computer-related or computer-controlled or operating-system-controlled machines or devices); facilitating the removal and insertion or disconnection and connection of such mass storage device(s) which is/are conventionally considered 'Fixed' and not 'Hot-Swappable' for use in running computers.

Description of Related Arts

In any computers installed with 'Fixed' mass storage device(s) such as hard disk, optical mass storage devices such as CD/DVD/HD-DVD/Blu-ray Disc drives, MO drives, Solid State Flash Disks/Drives, and other mass storage devices adopting interface types mentioned in the paragraph below, such 'Fixed' mass storage device(s) is/are so far not to be swapped or taken away and re-inserted while the computer is under the control of the operating system.

'Fixed' and 'Non-Hot-Swappable' mass storage device is defined and hereafter referred to as mass storage device that is directly connected to data cable(s) leading out from the data port on data bus of the motherboard and power cable(s) leading out from the power supply, which is also supplying power to the motherboard of a computer. This includes mass storage devices adopting interface types of IDE/EIDE/ATA/Ultra ATA/SATA/SATA II/SCSI/Ultra SCSI/Serial SCSI (Integrated Drive Electronics/Enhanced Integrated Drive Electronics/AT Attachment/Ultra AT Attachment/Serial AT Attachment/Serial AT Attachment II/Small Computer Systems Interface/Ultra Small Computer Systems Interface/Serial Small Computer Systems Interface). The above mentioned interface types are industry standards and commonly used by mass storage devices in computers for data exchange and storage. When attached to computers, mass storage devices adopting these interface types are considered 'Fixed' and 'Non-Hot-Swappable' because they are normally fixed and installed internally and are usually connected to the internal power supply which supplies also the power to the motherboard of a computer.

'Hot-Swap-Enabling' devices are especially designed with the capability for enabling 'Hot-Swap' (taken hereafter as meaning also 'Hot-Plug') for those 'Non-HotSwappable' mass storage media or devices attached to it. Using the case of hard disks for illustration, they are designed to have features meeting the following challenges for 'HotSwapping' as outlined in:
http://www.maxtor.com/en/documentation/white_papers/sata_hot_plug_white_paper.pdf Serial ATA (SATA)/Serial ATA II (SATA II) hard disks or other mass storage devices, such as Serial ATA (SATA)/Serial ATA II (SATA II) Solid State Flash Disk/Drive, are designed with 'Hot-Swap' capability. However if they are connected to the internal power supply which supplies also the power to the motherboard of a computer, they are usually not to be swapped, and especially when the operating system is running on them in the computer.

As other hard disks or mass storage devices (i.e. other than those using SATA/SATA II or similar technologies) mentioned above are not designed with 'Hot-Swapping' capability, they do not safely meet the above-mentioned challenges. Such hard disks or mass storage devices cannot therefore be 'Hot-Swapped' without being attached to device(s) especially designed to meet the above-mentioned challenges.

The advent of APM (Advanced Power Management) and ACPI (Advanced Configuration & Power Interface) and the developments in the sphere of Hot-Swapping technologies are intended to provide better power management and to increase flexibility and mobility of using a computer, including peripheral devices attached on or to it.

Specifications for APM and ACPI can be found at:
http://www.microsoft.com/whdc/archive/amp-12.mspx
and http://www.acpi.info Now the use of Hot-Swappable hard disks or hard disks connected to device enabling 'Hot-Swapping' is very common for huge computer servers. Externally connected Hot-Swappable hard disks, such as USB-ATA hard disks and Firewire-ATA hard disks also become in widespread use in personal computers and notebook computers. But in one way or another, they are either comparatively costly or relatively slow and involves interface translation, which relies on proper driver support that is not always available.

SUMMARY OF THE PRESENT INVENTION

This invention reveals a method of connecting such mass storage devices so that they can be easily 'Hot-Swapped' or removed and re-connected without involving complicated and expensive hardware and software.

The invention of "SWAPPING 'FIXED' 'SYSTEM' HARD DISK", also filed by the present inventor in another PCT International Application No. PCT/IB2004/050757, gives the details about how these hard disks can be 'Hot-Swapped' even if they are used as 'Fixed' 'System' hard disks. That invention however does not specify the method of connecting these hard disks and other mass storage devices mentioned above in this invention for turning these 'Fixed' mass storage devices into mobile mass storage devices that can be easily swapped or removed and re-connected both logically as well as physically. If these mass storage devices are used as the 'System' boot-up devices simulating a System Hard Disk, the method of the aforesaid invention should also be used together.

For the sake of simplicity, the following description will use the case of hard disks for an illustration of how such mass storage devices connected using this invention can be easily and safely 'hot-swapped' and used in its fastest possible speed as other mass storage devices, such as Solid State Flash Disk/Drives or optical mass storage devices such as DVD drives, can also simulate hard disks for use in computers.

Almost every standalone computer still comes with at least one or more 'Fixed' IDE/ATA hard disk(s), which become(s) a standard feature that cannot be dispensed with. And what is more, such 'Fixed' IDE/ATA hard disk(s) is/are intended or taught to be used as what it is labeled. They are fixed with a screw and put inside the computer. Users are cautioned that they are not 'Hot-Swappable' or 'Hot-Pluggable', i.e., not to be removed while the computer is running, especially the hard disk that is used as the 'System' hard disk from which the computer runs its operating system.

The advent of the USB and the IEEE 1394/Firewire (1394) specifications provides the possibility of turning a hard disk into a mobile 'Hot-Swappable' hard disk. Their implementation however relies mainly on the use of hard disks adopting interface types of the industry standards mentioned above; the most commonly used standard is the IDE/ATA standard. The conventional implementation using such USB or 1394 technologies for accessing hard disks involves a further step of data interface translation. The computer talks to a USB or 1394 device, which provides an interface translating the data communication into, for instance, the IDE/ATA standard to be understood by the IDE/ATA hard disk attached in the device and vice versa.

The implementation of this interface translation implies additional resources required in the form of manpower or mindpower for developing the software device drivers required as well as additional hardware such as the electronic gadgets embedded on the interface card. Given that there are different kinds of operating systems and different computer hardware platforms, the scale of efforts required for solving the issues relating to the technical complexity and compatibility involved can be imagined. Furthermore, for instance, as compared with the ATA standard, the USB standard is relatively slow and its operating speed varies widely under different operating systems depending on the availability of hardware/software driver support. The requirement of interface translation further cuts down the speed of data transmission between the ATA hard disk and the computer. This degradation in speed of hard disk access is unnecessary as revealed by the present invention.

Besides the above problems, for instance, if the USB-ATA hard disk is to be used as the 'System' hard disk, lack of device driver support may prevent an operating system from being directly loaded up and run on it, such as is the case for the series of operating system of Microsoft Windows 95/98/ME/NT/2K/XP. This problem is further elaborated in another PCT International Application No. PCT/IB2005/051623, entitled "ROLLING MICROSOFT WINDOWS" also revealed by the present inventor.

Together with the previously mentioned invention, "SWAPPING 'FIXED' 'SYSTEM' HARD DISK", this invention makes it easy to load up an operating system to run as a ramdisk-based operating system and to swap or remove or re-connect the 'System' hard disk as desired. This previous invention specifies that the 'System' hard disk be connected to a separate or external power supply which is not supplying power to the motherboard of a computer if the 'System' hard disk is to be safely 'Hot-Swapped'.

This separate or external power supply can be easily conceived as a separate battery attached to a case encasing the hard disk or a power supply extending from a fixed electricity outlet within premises. In the case of using a battery for the hard disk, there is an additional cost; and in the case of using a fixed electricity supply source, the mobility for computing is compromised.

Adopting the methods revealed in the previous invention, "SWAPPING 'FIXED' 'SYSTEM' HARD DISK", as well as in the present invention, the 'System' hard disk or other mass storage devices simulating the 'System' hard disk can be swapped at will without the above disadvantages. Furthermore, this invention can also be used for swapping hard disk(s) or other mass storage device(s) not used as the 'System' hard disk in a similar manner without the need for running a ramdisk-based operating system.

Technical Solution

The method revealed by this invention applies to computers running an operating system that are enabled with or have support for APM or ACPI or similar technologies. The computer should also have support for USB/1394/PCMCIA or similar technologies that provide corresponding power management capabilities or facilities for providing and/or managing power supply to devices that are attached to the USB/1394/PCMCIA or similar ports. Information about the USB/1394/PCMCIA specifications and the relevant technologies can be found respectively at:

http://www.usb.org/
http://www.1394ta.org/
http://www.pcmcia.org/

The USB/1394/PCMCIA technologies are designed to provide easy management of externally attached peripheral devices for the use of a computer. They provide 'Hot-Swapping' support for those peripheral devices attached; providing support for power management as well as data transmission to and from those devices attached.

Taking hard disk as an example for illustration again, the problems for USB-ATA hard disk described above stem from the conventional way of using such technologies. Manufacturers are trying very hard to meet all the specification requirements. This is in itself no problem; but that may not be the best solution. Manufacturers try to meet the USB specifications in providing both power management as well as data transmission for the USB-ATA hard disk. For data transmission, an interface translation is therefore required for data to be passed between the ATA hard disk and the computer through the USB port. As said earlier, this gives rise to double-penalty affecting data transmission rate; USB technology is slower in data transmission than the ATA standard and the need for interface translation further worsens the problem.

The technical solution to these problems is thus very simple; applying the principle of "Caesar's to Caesar, God's to God": to make use of USB/1394/PCMCIA or similar technologies for their power management capabilities or facilities for supplying the power required for the operations of the mass storage device(s) and to connect the mass storage device(s) to the data interface with which the mass storage device(s) is/are equipped for data transmission without intervening data interface translation; that is, for instance, the ATA hard disk is directly connected to the ATA data bus interface of the computer using the corresponding data cable.

The present invention basically includes the following steps for connecting mass storage device(s) for use in computers as described in the method below:

A method for connecting mass storage device(s) for use in computer-related or computer-controlled or operating-system-controlled machines or devices with support for APM or ACPI or similar technologies as well as USB/1394/PCMCIA or similar technologies, comprising steps of (a) connecting the mass storage device(s) with data cable(s) or data connection device(s) connecting, without data interface translation inbetween, to the data port(s) on data bus(es) of the motherboard(s) of the computer-related or computer-controlled or operating-system-controlled machines or devices, wherein such data port(s) and data bus(es) of the motherboard(s) having the same interface type(s) as that of the mass storage device(s) so connected to such data port(s) and the mass storage device(s) having interface type(s), including but not limited to IDE/EIDE/ATA/Ultra ATA/SATA/SATA II/SCSI/Ultra SCSI/Serial SCSI; and (b) connecting the mass storage device(s) with power cable(s) or power connection device(s) connecting to port(s) anywhere on bus(es) of USB/1394/PCMCIA or similar technologies for utilizing the power management capabilities or facilities offered by such technologies.

Used together with some or all of the steps revealed in the previously mentioned invention, "SWAPPING 'FIXED' 'SYSTEM' HARD DISK", the hard disk(s) or mass storage device(s) mentioned above, whilst running in fastest possible speed in use, can be 'swapped' easily and safely at any time.

The method for 'Hot-Swapping' 'Fixed' 'System' hard disk(s) as revealed in the aforesaid invention, "SWAPPING 'FIXED' 'SYSTEM' HARD DISK", is quoted as follows for an understanding of how, in conjunction with that invention, the present invention can be easily used for 'Hot-Swapping' hard disk(s) or other mass storage device(s):

"A method for 'Hot-Swap' of 'Fixed' 'System' hard disk(s) in and out of a computer (used hereafter as including computer-related or computer-controlled machines and devices) and for re-cycling the computer between 'diskly' state to 'diskless' state, comprising steps of (a) starting to run a computer, which has or is enabled with support for APM or ACPI or similar technologies, from 'Fixed' 'System' hard disk(s) and bootstrapping the image of the target operating system, which has the capability of being taken to run as a ramdisk-based operating system, to run as a ramdisk-based operating system;

(b) making preparation for removing the need for access by the computer and the operating system to the target 'Fixed' 'System' hard disk(s) and leaving the computer in the normal running state that the target 'Fixed' 'System' hard disk(s) is/are to be disconnected;

(c) disconnecting the target 'Fixed' 'System' hard disk(s); and (d) re-connecting the original 'Fixed' 'System' hard disk(s) or some other 'Fixed' hard disk(s).

'Fixed' 'System' hard disk, in this method, is defined and hereafter referred to as hard disk, including but not limited to the IDE/EIDE/ATA/SATA/Ultra ATA/SCSI/Ultra SCSI industry-standard types of hard disks, that is (1) directly connected to data cable(s) leading out from the motherboard and power cable(s) leading out from a separate external or a separate internal power supply, which is not supplying power to the motherboard and other components of the computer; or (2) connected to data cable(s) leading out from a controller interface card directly connected to the system bus of the motherboard and power cable(s) leading out from a separate external or a separate internal power supply, which is not supplying power to the motherboard and other components of the computer; or (3) connected to a device that is connected in the manner of either (a) or (b) above and that device has no additional support for translating the data input/output interface of the connected hard disk(s) into another type of data input/output interface to be connected to and identified as such by the computer when the computer starts from every power-on or rebooting and runs or bootstraps or draws the system image of the controlling operating system from such hard disk.

The said step of (b) above comprising steps of:

(i) removing all need for access to the 'Fixed' 'System' hard disk(s) under concern by the operating system and the applications running therein; (ii) flushing software disk caches for such hard disk(s); (iii) flushing hardware disk caches for such hard disk(s); (iv) spinning down or stopping such hard disk(s); (v) logically removing or hiding or disconnecting such hard disk(s) so that the operating system ignores or becomes unaware of the existence of such hard disk(s) at the filesystem level and/or on its device list; and (vi) leaving the computer in the normal running state; where the implementation of steps, capable of being implemented in computer-executable program(s) and/or computer-executable instruction(s), of this method may be carried out through user or program instruction(s), including the use of standard command(s), application(s) or program(s) in the running operating system.

The said step of (c) above comprising the following acts: physically disconnecting the target hard disk(s) from the computer by hand or through the operation of other device(s); preferably disconnecting first the data cable connection and then the power cable connection.

The said step of (d) above comprising steps of:

(i) physically re-connecting the target hard disk(s) to the computer by hand or through the operation of other device(s); preferably connecting first the power cable connection and then the data cable connection; and (ii) logically connecting such hard disk(s) so that the operating system becomes aware of the existence of such hard disk(s) at the filesystem level and/or on its device list; where the implementation of this step, capable of being implemented in computer-executable program(s) and/or computer-executable instruction(s), may be carried out through user or program instruction(s), including the use of standard command(s), application(s) or program(s) in the running operating system."

Using this invention for 'Hot-Swapping' hard disk(s) or mass storage device(s) when they are not used as or simulating the 'System' hard disk, there is no need for the step of running the operating system as a ramdisk-based operating system.

For perfecting the swapping process, before or after the insertion or removal of the mass storage device, one has to duly exercise the step of powering up/down or enabling/disabling the port or intelligent power device attached to the port on the bus of USB/1394/PCMCIA or similar technologies for use in the process of connecting/disconnecting the mass storage device.

Advantageous Effects

This method of connecting mass storage devices of interface types mentioned above does away with the need for data interface translation that is required for employing USB/1394/PCMCIA or similar technologies for using such mass storage devices. It allows the data transmission between the computer and these mass storage devices to be conducted in their respective data interfaces, removing the delay effects on access due to data interface translation.

On the other hand, the power management capabilities or facilities offered by USB/1394/PCMCIA or similar technologies can be used for 'Hot-Swapping', making possible using these mass storage devices as truly mobile mass storage devices, whether they are used as or simulating the 'System' hard disk or not, without compromising its data access rate.

The conventional way of connecting these mass storage devices to the internal power supply of a computer or to the internal or external battery does not offer any sophisticated power management capabilities or facilities. Though these mass storage devices can be stopped by the method revealed in the invention, "SWAPPING 'FIXED' 'SYSTEM' HARD DISK", the power supply cable to it is still active and not turned off and has no intelligence. This may expose these mass storage devices to physical hazards if used for 'Hot-Swapping'. This means that the computer is better to be turned off before these mass storage devices are to be removed. The present invention therefore represents a very simple and easily implemented way for making these mass storage devices, external, mobile and swappable under all circumstances if necessary steps are followed as revealed in the invention, "SWAPPING 'FIXED' 'SYSTEM' HARD DISK", mentioned above as well as in this invention. And these mass storage devices of interface types mentioned above can also be used in the fastest possible speed as well.

The data interface translation required for employing USB/1394/PCMCIA or similar technologies in the conventional way for using these mass storage devices makes it very difficult, if not impossible, for loading up and running operating systems from them if they are used as or simulating the 'System' hard disk in use because of the technical complexity and compatibility involved in designing and implementing storage device drivers for use under different platforms of hardware and operating systems. So mass storage devices used with such technologies in the conventional way can hardly be used as or simulate the 'System' hard disk in use for advanced operating systems on different hardware platforms. This invention therefore makes possible the fact that the computer accesses such mass storage devices using their respective data interface for and with which they are designed and built. And as all operating systems are designed with using these mass storage devices of the industry-standard interface types mentioned above in mind, the necessary storage device driver for loading the operating system up and running on these mass storage devices is already built-in; so there should be no problem for loading up and running the operating system, using these mass storage devices as the 'System' hard disk if the computer can make use of the aforesaid technologies, i.e. USB/1394/PCMCIA or similar technologies, for giving power supply to these mass storage devices during the booting process when using the present invention for their connection to the computer.

DETAILED DESCRIPTION OF THE PREFERRED EMBODIMENT

Figure 1:
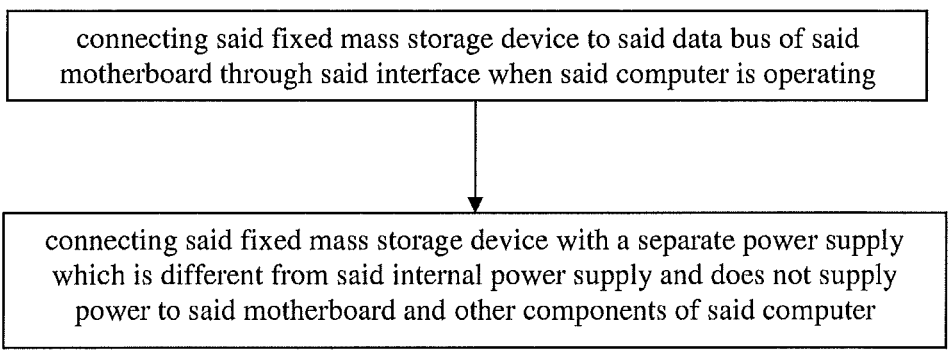
FIG. 1 is a schematic diagram of a method of connecting a fixed mass storage device with a computer having a motherboard according to a preferred embodiment of the present invention.
Figure 2:
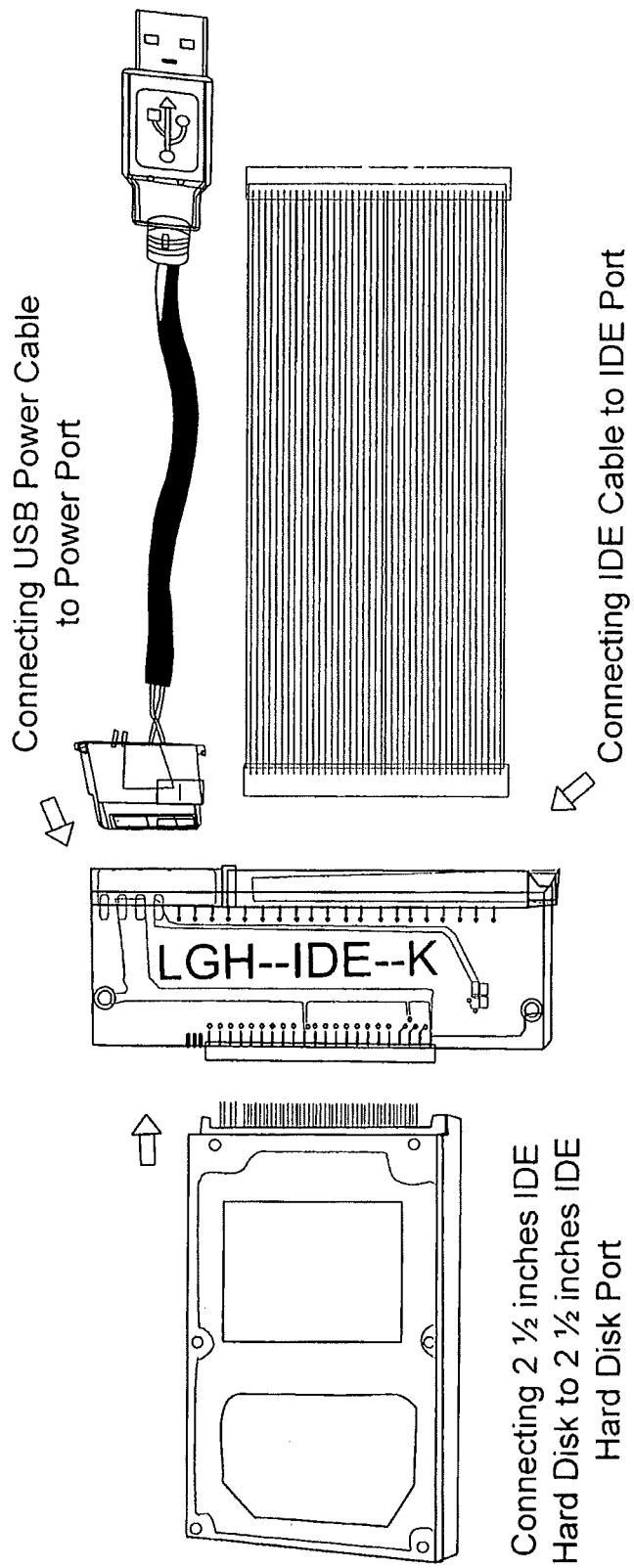
FIG. 2 illustrates the connection among IDE hard Disk, IDE cable, and USB power cable according to the above preferred embodiment of the present invention.
Figure 3:
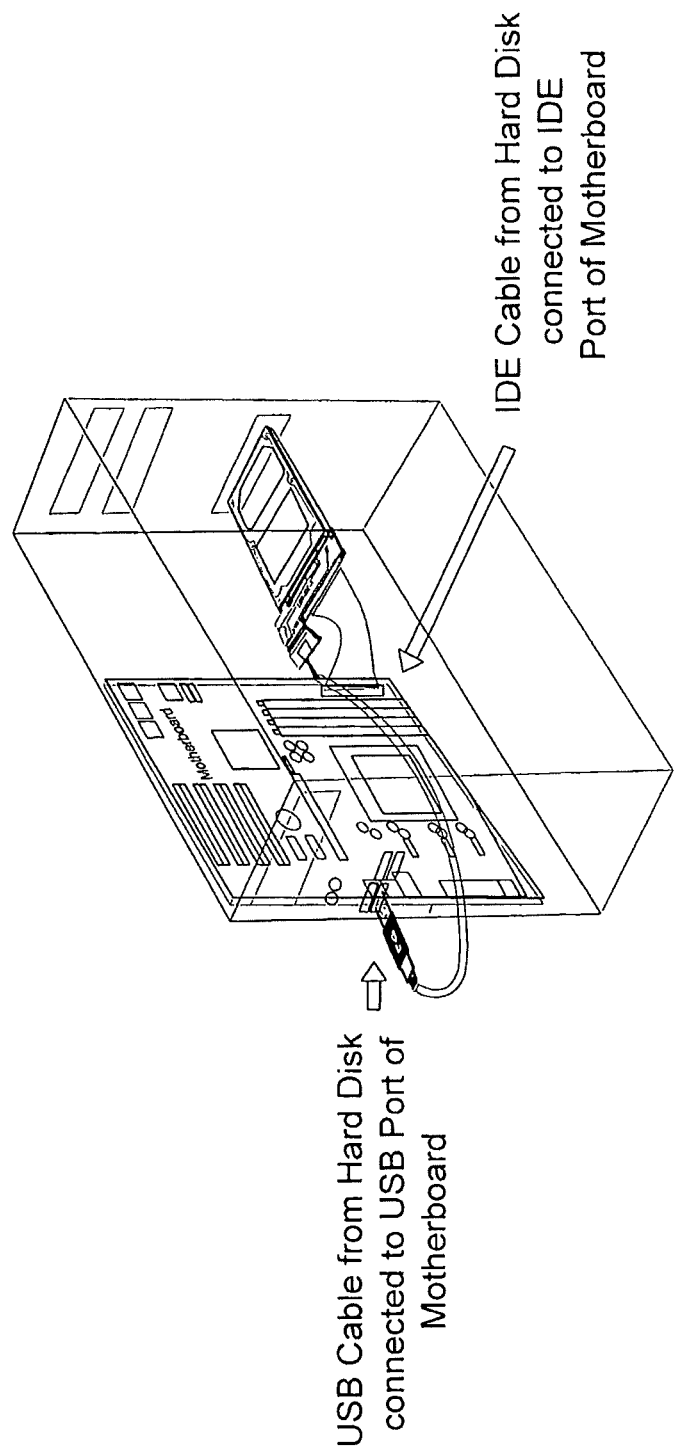
FIG. 3 illustrates IDE cable and USB cable being connected to IDE port and USB port of motherboard respectively according to the above preferred embodiment of the present invention.

Referring to FIG. 1 to FIG. 3 of the drawings, for the best purpose of illustration, a computer can expose both its USB port and its ATA data port as external ports for the connection of an external mobile ATA hard disk with data cable connecting to the ATA data port and the power cable, with duly and suitably designed or adapted wiring, connected to the power pins of the USB port. The USB specifications specify that any one port on a USB bus can be powered down, powered up, disabled and enabled. By using such power management capabilities or facilities, one can duly devise a USB driver or an application programme for controlling the specific USB port(s) (or USB intelligent power device attached to such USB port(s) as mentioned in the paragraph below) to which the hard disk is attached, to the effect that power supply to the hard disk can be started or stopped.

As the data pins of the USB port(s) are not used, the hard disk so attached is not USB intelligent. It is the operating system under the direction of the user that controls the power management facilities provided by the USB bus, operating on the specific port(s) to which the hard disk is connected or disconnected. USB intelligent power device can thus be devised to act as an intelligent USB agent for controlling power supply to the hard disk attached to it. For hard disk needing more power than that can be supplied through one USB port, it is also possible to devise such USB intelligent power device to make use of power supply from more than one USB port for supplying adequate power to the hard disk. Information of such USB power cable or device is, for instance, available at http://www.poweredusb.org/.

For instance, USB-ATA hard disk, if used in the conventional way that both data transmission and power management is done through the USB port to which the ATA hard disk is connected, cannot be used for installing Microsoft Windows 98 and cannot be used for loading up and running Microsoft Windows 98 on it. With the use of this invention that data transmission is done through between the data port of the ATA data bus on the motherboard and that of the ATA hard disk and power is supplied through the USB port to the hard disk, the installation process of Microsoft Windows 98 can be completed as usual and the ATA hard disk is recognized by Microsoft Windows 98 as an ordinary 'Fixed' 'System' hard disk as well. If the method for 'Hot-Swapping' 'Fixed' 'System' hard disk as revealed in the invention, "SWAPPING 'FIXED' 'SYSTEM' HARD DISK", and the method as revealed in this invention are used together, this 'Fixed' 'System' hard disk can be easily taken out.

For higher degree of protection, program instructions can be developed, according to the USB specifications, for use to, before taking out the ATA hard disk, power down or disable the USB port (or USB intelligent power device attached to such USB port) to which the adapted USB power cable of the ATA hard disk is connected; and to, after re-inserting the same or another ATA hard disk or other mass storage devices such as a DVD drive or a Solid State Flash Disk/Drive, re-power up or re-enable the USB port (or USB intelligent power device attached to such USB port) under concern. Though perhaps desirable, this step is not absolutely necessary because the USB specifications already make safety provisions for physically removing USB cables or devices from USB ports.

Mode for Invention

What is said for the USB technology above can also be applied using 1394/PCMCIA or similar technologies subject to the capabilities and facilities provided for and specified by their respective specifications. It is also noted that such interfaces can be translated into each other, for instance, it is available in the market that USB ports are provided on a PCMCIA card for use. Also for hard disk(s) requiring more power supply, for instance, 1394 port together with 1394 intelligent power device can be another alternative to USB port and USB intelligent power device.

This invention therefore provides a method for connecting mass storage devices that facilitates the swapping of 'Fixed' mass storage devices especially for standalone personal computers, mobile notebook computers as well as hand-held devices, such as Ultra-mobile PC, in a relatively convenient and easily implemented way without having to employ sophisticated and costly devices. The mass storage devices can also be used in their fastest data transmission mode. Furthermore, for instance, after hot-removing a hard disk, a Solid State Flash Disk/Drive or a rewriteable DVD drive, can be re-connected and used instead.

INDUSTRIAL APPLICABILITY

This invention reveals a method for connecting the hard disk or Solid State Flash Disk/Drive simulating hard disk, facilitating the implementation of the invention, "SWAPPING 'FIXED' 'SYSTEM' HARD DISK", mentioned earlier, facilitating the final removal of the last headache for standalone computers running with the 'Fixed' 'System' hard disk(s). Hard disk(s) with interface types mentioned above are relatively cheap and fast. The dawning of the Internet era comes with the phenomenon of widespread use of web browsing, email exchanges, peer-to-peer online communications and sharing of files. This creates a hotbed for virus infections. Virus infections frequently target the 'System' disk(s) as the victim. 'Hot-Swappable' removable storage media or devices such as USB-ATA hard disk, MO disk, bootable CDROM, etc. can be easily removed after booting up a ramdisk-based operating system. But the use of such removable storage media or devices is relatively slow, about 10 or more times slower than using the 'Fixed' 'System' hard disk(s) having the industry-standard IDE/ATA interfaces as the booting media. By using the method introduced in this invention and the aforesaid invention, any standalone computer can now do away with the 'Fixed' 'System' hard disk(s) and the headaches of virus infections and computer failures due to constant wear and tear associated with such hard disk(s). This applies similarly to Solid State Flash Disk/Drive used as a hard disk.

A clean 'Fixed' 'System' hard disk or Solid State Flash Disk/Drive can be used for booting any number of computers of same or similar hardware configuration to run with ramdisk-based operating system for operating system that is capable of such running method. This helps in computer maintenance. It is especially useful for organization with standard configuration for a number of computers, such as a school or any office with a number of standard computers, as well as net bar or net kiosk. For any number of standard computers, a system image stored on such a hard disk or Solid State Flash Disk/Drive is sufficient. Should the computer configuration differ from one machine to another, a hard disk or Solid State Flash Disk/Drive of 120 Gb can provide for more than 100 computers with system image of about 1 Gb in size. For any operating system that can be run in compressed format such as Windows 98, this 1 Gb system image size can represent about 2 Gb ramdisk-based operating system image, which is more than sufficient for most system configuration and application use.

For instance, besides being relatively slow, the conventional way of implementing USB-ATA hard disk connection makes it very difficult to load up and run some advanced operating systems, such as Microsoft Windows 95/98/ME/NT/2K/XP, on it because of the lack of storage device drivers for doing so. These two problems are solved by using this invention.

Because of the mobility and swappability offered by this invention for mass storage device connection, intelligent power devices of USB/1394/PCMCIA or similar technologies can be devised and produced for market use. New design of casing for these mobile mass storage devices can be tailored-made so as to provide for these new forms of power source. New computers may have a new design with this invention of usage in mind. For example, the computer can expose a data port of the IDE/ATA interface for data connection with the IDE/ATA mass storage devices, which can now be powered through USB port(s) with the use of the power management capabilities and facilities offered by USB/1394/PCMCIA or other similar technologies. In this way, these mass storage devices can be turned external and mobile for use and easy replacement and exchange for one and other. This is especially convenient for their use in hand-held Ultra Mobile PC, which can be turned diskless if running with a ramdisk-based operating system. After taking out the hard disk or Solid State Flash Disk/Drive, a DVD drive can be replaced for use and then vice versa if needed for use.

The prior art for the implementation of this invention includes APM, ACPI or other similar technologies and their specifications as well as USB/1394/PCMCIA or other similar technologies and their specifications; operating systems and computers and the associated software and hardware supporting such technologies, particularly industry-standard mass storage device(s) having interface type(s), including but not limited to IDE/EIDE/ATA/Ultra ATA/SATA/SATA II/SCSI/Ultra SCSI/Serial SCSI; and operating-system-executable instructions commonly used in operating systems for putting the computer, the mass storage device(s) and the port(s) on a bus of USB/11394/PCMCIA or other similar technologies into various power management states; and in particular the invention, "SWAPPING 'FIXED' 'SYSTEM' HARD DISK", mentioned earlier.

In combination with the use of the technical features contained in the prior art stated above, this invention makes possible connecting mass storage device(s) with data connection device(s) connecting to the data port(s) on the data bus of interface type respective to that of the connected mass storage device(s) for data transmission, and connecting such mass storage device(s) with power connection device(s) connecting to port(s), for power supply, on a bus of technologies, such as USB/11394/PCMCIA or other similar technologies, with power management capabilities and facilities in computer-related or computer-controlled or operating-system-controlled machines or devices, for controlling, using and exchanging the mass storage device(s), making the mass storage device(s) as fast, mobile and exchangeable as possible for use; and, in this relation, is characterized by the following claims:

What is claimed is:

1. A hot-swappable mass storage device comprising a power port and a data port, the mass storage device being connectable to a computing device having access to a non-transitory computer-readable storage medium having stored thereon, computer-executable program code, that, if executed by the computing device, causes the computing device to perform operations comprising, upon a hot-swapping-in process:
   accepting a connection of the data port of the mass storage device to that of a data bus of an interface provided by a motherboard of the computing device without interface translation throughout a whole connection between a data interface of the computing device at one end and a data interface of the mass storage device at the other end whether using a data cable or a data connection device, wherein the interface corresponds to the standard of the mass storage device; and
   accepting a connection of the power port of the mass storage device using a power cable or a power connection device, to a power port on a programmable bus of technology with power management capabilities or facilities on the motherboard of the computing device, which are controllable by an application program, as a source for power supply and management;
   further comprising, upon a hot-swapping-out process when the computing device is operating in normal running state:
   removing need for access as well as access to the mass storage device from the computing device by:
      removing all needed file access from the mass storage device;
      flushing software disk caches for the mass storage device;
      flushing hardware disk caches for the mass storage device;
      stopping the mass storage device; and
      logically removing the mass storage device from the computing device;
   leaving the computing device in normal running state; and
   physically disconnecting the mass storage device from the data bus and the programmable bus of technology with power management capabilities or facilities.

2. The mass storage device of claim 1, wherein the bus of technology with power management capabilities or facilities does not supply power to the motherboard.

3. The mass storage device of claim 1, wherein the operations further comprise, upon the hot-swapping-in process:
   establishing a logical connection of the data port of to the data bus using a data cable or a data connection device without interface translation;
   establishing a logical connection of the power port of the mass storage device using a power cable or a power connection device to a power port on the programmable bus of technology; and
   establishing a logical connection of the mass storage device to the computing device so as to allow the computing device to become aware of the existence of the mass storage device.

4. A non-transitory computer-readable storage medium having stored thereon, computer-executable instructions that, if executed by a computer, cause the computer to connect a mass storage device to a computing device, the instructions comprising:
   instructions for connecting a data port of the mass storage device to that of a data bus of an interface provided by a motherboard of the computing device without interface translation throughout a whole connection between a data interface of the computing device at one end and a data interface of the mass storage device at the other end whether using a data cable or a data connection device, wherein the interface corresponds to the standard of the mass storage device; and
   instructions for connecting a power port of the mass storage device using a power cable or a power connection device to a power port on a programmable bus of technology with power management capabilities or facilities on the motherboard of the computing device, which are controllable by an application program, as a source for power supply and management, making hot-swapping of the mass storage device possible.

5. The non-transitory computer-readable storage medium of claim 4, wherein the bus of technology with power management capabilities or facilities does not supply power to the motherboard.

6. The non-transitory computer-readable storage medium of claim 4, wherein the instructions further comprise, upon the hot-swapping-in process:
   instructions for logically connecting a data port of the mass storage device to the data bus using a data cable or a data connection device;
   instructions for logically connecting a power port of the mass storage device using a power cable or a power connection device to a power port on the programmable bus of technology; and
   instructions for logically connecting the mass storage device to the computing device so as to allow the computing device to become aware of the existence of the mass storage device.

7. The non-transitory computer-readable storage medium of claim 4, wherein the instructions further comprise, upon the hot-swapping-out process, instructions for removing need for access as well as access to the mass storage device from the computing device, the instructions for removing comprising:
   instructions for removing all needed file access from the mass storage device;
   instructions for flushing software disk caches for the mass storage device;
   instructions for flushing hardware disk caches for the mass storage device;
   instructions for stopping the mass storage device; and
   instructions for logically removing the mass storage device from e computing device.

8. An interface for connecting a mass storage device with a computing device, the interface being configured to:
   allow a connection of a data port of the mass storage device to that of a data bus of an interface provided by a motherboard of the computing device without interface translation throughout a whole connection between a data interface of the computing device at one end and a data interface of the mass storage device at the other end whether using a data cable or data connection device,
   wherein the interface corresponds to the standard of the mass storage device; and
   allow a connection of a power port of the mass storage device using a power cable or power connection device to a power port on a programmable bus of technology with power management capabilities or facilities on the motherboard of the computing device, which are controllable by an application program, as a source for power supply and management, to enable hot-swapping of the mass storage device.

9. The interface of claim 8, wherein the bus of technology with power management capabilities or facilities does not supply power to the motherboard.

10. The interface of claim 8, wherein the interface is provided by the motherboard.

11. The interface of claim 8, wherein the interface enables the hot-swapping by being further configured to:
allow a physical connection of a data port of the mass storage device to the of the data bus of the motherboard of the computing device without interface translation throughout the whole connection between the data interface of the computing device at the one end and the data interface of the mass storage device at the other end whether using a data cable or a data connection device;
allow a physical connection of a power port of the mass storage device using a power cable or a power connection device to a power port on the programmable bus of technology with power management capabilities or facilities on the motherboard of the computing device; and
allow a logical connection of the mass storage device to the computing device so as to allow the computing device to become aware of the existence of the mass storage device.

12. The interface of claim 8, wherein the interface enables the hot-swapping when the mass storage device is connected to the computing device and the computing device is operating in a normal running state by being further configured to:
allow removal of need for access as well as access to the mass storage device from the computing device by being configured to:
allow removal of all needed file access from the mass storage device;
allow flushing of software disk caches for the mass storage device;
allow flushing of hardware disk caches for the mass storage device;
allow stopping the mass storage device; and
allow logically removing the mass storage device from the computing device;
allow leaving the computing device in the normal running state; and
allow physically disconnecting the mass storage device from the data bus and the programmable bus of technology with power management capabilities or facilities.

13. The interface of claim 8, wherein the interface is an interface connection device.

14. A connection device being connectable to a computer having access to a non-transitory computer-readable storage medium having stored thereon, program instructions that, in response to execution by the computer, cause the computer to perform a method for connecting a mass storage device to a computing device, the method comprising:
connecting a data port of the mass storage device to that of a data bus of an interface provided by a motherboard of the computing device without interface translation throughout a whole connection between a data interface of the computer device at one end and a data interface of the mass storage device at the other end whether using a data cable or a data connection device, wherein the interface corresponds to the standard of the mass storage device; and
connecting a power port of the mass storage device using a power cable or a power connection device to a power port on a programmable bus of technology with power management capabilities or facilities on the motherboard of the computing device, which are controllable by an application program, as a source for power supply and management, making hot-swapping of the mass storage device possible.

15. The method of claim 14, wherein the bus of technology with power management capabilities or facilities does not supply power to the motherboard.

16. The method of claim 14, wherein the computer is the computing device.

17. The method of claim 14, wherein the connection device is a data connection device.

18. The method of claim 14, wherein the connection device is a power connection device.

19. The method of claim 14, wherein the hot-swapping comprises:
physically connecting a data port of the mass storage device to that of a data bus of an interface provided by the motherboard of the computing device by the use of a data cable or a data connection device without interface translation throughout the whole connection between the data interface of the computer device at the one end and the data interface of the mass storage device at the other end, wherein the interface corresponds to the standard of the mass storage device;
physically connecting a power port of the mass storage device by the use of power cable or power connection device to a power port on a programmable bus of technology with power management capabilities or facilities on the motherboard of the computing device, which are controllable by an application program, as a source for power supply and management; and
logically connecting the mass storage device to the computing device so as to allow the computing device to become aware of the existence of the mass storage device.

20. The method of claim 14, wherein when the computing device is operating in a normal running state, the hot-swapping of the mass storage device comprises:
removing need for access as well as access to the mass storage device from the computing device by:
removing all needed file access from the mass storage device;
flushing software disk caches for the mass storage device;
flushing hardware disk caches for the mass storage device;
stopping the mass storage device; and
logically removing the mass storage device from the computing device;
leaving the computing device in a normal running state; and
physically disconnecting the mass storage device from the data bus and the programmable bus of technology.

21. A motherboard of a computing device, the motherboard being configured to:
provide a data bus of an interface on the motherboard of the computing device connecting to a mass storage device without interface translation throughout a whole connection between a data interface of the computer device at one end and a data interface of the mass storage device at the other end whether using a data cable or a data connection device, wherein the interface corresponds to the standard of a mass storage device having the data port for connecting, via the data cable or the data connection device, to the data port of the data bus on the motherboard of the computing device; and provide, as a source for power supply and management, a programmable bus of technology-having:

power management capabilities or facilities controllable by an application program of the computing device; and a power port configured to connect to a power port of the mass storage device via a power cable or a power connection device.

* * * * *